United States Patent
Miyazaki et al.

(10) Patent No.: US 11,652,220 B2
(45) Date of Patent: May 16, 2023

(54) FUEL CELL

(71) Applicant: TOYOTA JIDOSHA KABUSHIKI KAISHA, Toyota (JP)

(72) Inventors: Daichi Miyazaki, Toyota (JP); Masaki Hirano, Toyota (JP); Hitoshi Tanino, Toyota (JP); Tomonari Kogure, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/445,674

(22) Filed: Aug. 23, 2021

(65) Prior Publication Data
US 2022/0109163 A1  Apr. 7, 2022

(30) Foreign Application Priority Data

Oct. 1, 2020  (JP) .............................. JP2020-166711
Jan. 22, 2021  (JP) .............................. JP2021-008827

(51) Int. Cl.
*H01M 8/0228* (2016.01)
*H01M 8/0213* (2016.01)
*H01M 8/0206* (2016.01)

(52) U.S. Cl.
CPC ....... *H01M 8/0228* (2013.01); *H01M 8/0206* (2013.01); *H01M 8/0213* (2013.01)

(58) Field of Classification Search
CPC ............. H01M 8/0228; H01M 8/0206; H01M 8/0213; Y02E 60/50
See application file for complete search history.

(56) References Cited

U.S. PATENT DOCUMENTS

| 2005/0214618 A1* | 9/2005 | Oh .......................... C23C 30/00 429/514 |
| 2017/0141410 A1 | 5/2017 | Ikeda et al. |

FOREIGN PATENT DOCUMENTS

| JP | 2011134653 A | 7/2011 |
| JP | 2016201205 A | 12/2016 |

* cited by examiner

*Primary Examiner* — Helen Oi K Conley
(74) *Attorney, Agent, or Firm* — Hunton Andrews Kurth LLP

(57) ABSTRACT

The present embodiment is a fuel cell including a stacked body of single cells each of which includes a power generating unit and separators disposed on both surfaces of the power generating unit, in which the separators each include a metal base material, a carbon layer made of carbon and formed on a first surface of the metal base material on a power generating unit side, and a titanium nitride layer made of titanium nitride and formed on a second surface of the metal base material opposite to the first surface.

5 Claims, 3 Drawing Sheets

FUEL CELL

CROSS-REFERENCE TO RELATED APPLICATION

This application claims priority to Japanese Patent Application No. 2020-166711 filed on Oct. 1, 2020 and Japanese Patent Application No. 2021-008827 filed on Jan. 22, 2021, each incorporated herein by reference in its entirety.

BACKGROUND

1. Technical Field

The present disclosure relates to a fuel cell.

2. Description of Related Art

A fuel cell includes a plurality of structures in which a solid polymer electrolyte membrane is interposed between an anode electrode and a cathode electrode as a single cell. Further, the fuel cell is configured as a stacked body in which cells of a plurality of the single cells are stacked via a separator (also referred to as a bipolar plate) having a groove formed as a flow path for gas (hydrogen, oxygen, or the like). The output of the fuel cell can be increased by increasing the number of the single cells per stacked body.

The separator of the fuel cell also has a role of allowing a generated current to flow to an adjacent cell through a surface through which a coolant flows, a high conductivity, that is, low contact resistance is needed.

In order to satisfy such a need, for example, Japanese Unexamined Patent Application Publication No. 2016-201205 (JP 2016-201205 A) discloses a fuel cell stack in which the single cells each of which includes the separators disposed on both surfaces of a power generating body are stacked, in which the separator is in contact with the power generating body via a titanium nitride layer formed on one surface side of the separator and a conductive carbon layer formed on the titanium nitride layer, and is in contact with the other surface side of another separator adjacent thereto via a titanium nitride layer formed on the other surface side of the separator.

SUMMARY

Here, in the fuel cell, in order to improve the power generation performance of the fuel cell, as described above, the separator to be used is needed to have the low contact resistance, and also have excellent durability such that the low contact resistance is maintained for a long period of time. Specifically, in the fuel cell, the low pH product water (corrosive liquid) including a chloride ion or a fluoride ion is generated when the fuel cell is used, and thus the separator used in the fuel cell is needed to have low initial contact resistance and suppress an increase in the contact resistance as much as possible even in a use environment of the fuel cell.

However, in the separator disclosed in JP 2016-201205 A, in a case where a content of a carbon material is increased in an attempt to realize a lower contact resistance, a content of a resin is reduced, a strength of the membrane is reduced, and the durability is reduced. On the other hand, in a case where the content of the resin is increased in an attempt to increase the strength of the membrane, the content of the carbon material is reduced and the contact resistance is increased. Therefore, the technique disclosed in JP 2016-201205 A has a difficulty of further reducing the contact resistance while ensuring the excellent durability.

Therefore, the present disclosure is to provide a fuel cell having both the excellent contact resistance and durability.

An aspect of the present embodiment is as follows.

(1) An aspect of the present disclosure relates to a fuel cell including a stacked body of single cells each of which includes a power generating unit and separators disposed on both surfaces of the power generating unit. The separators each include a metal base material, a carbon layer made of carbon and formed on a first surface of the metal base material on a power generating unit side, and a titanium nitride layer made of titanium nitride and formed on a second surface of the metal base material opposite to the first surface.

According to the present embodiment, the fuel cell having both the excellent contact resistance and durability can be provided. Specifically, in the present embodiment, the carbon layer made of carbon is formed on the first surface of the separator on the power generating unit side. The carbon layer made of carbon has a high membrane strength due to the excellent durability thereof and has excellent conductivity, and thus the contact resistance of the separator can be reduced. Further, in the fuel cell according to the present embodiment, the titanium nitride layer made of titanium nitride is formed on the second surface (that is, a surface on the adjacent separator side) opposite to the first surface of the separator. By forming the titanium nitride layer on the surface of the separator, the oxidation of the surface of the separator can be suppressed, the formation of an oxide membrane can be suppressed, and an increase in the contact resistance of the separator with time can be suppressed. As a result, an increase in internal resistance of the fuel cell with time can be suppressed.

(2) The fuel cell according to (1), in which a titanium layer made of titanium may be provided between the metal base material and the carbon layer.

Since the adhesion between the metal base material (for example, stainless steel base material) and the titanium layer and the adhesion between the titanium layer and the carbon layer are excellent, the titanium layer can further firmly bond the carbon layer to the stainless steel base material. As a result, the membrane strength of the carbon layer can be further improved, and the improvement can contribute to the reduction of the contact resistance of the separator. In addition, by adding the corrosion resistance of the titanium layer, the corrosion resistance of the separator can be remarkably improved.

(3) The fuel cell according to (1) or (2), in which the metal base material may be a stainless steel base material.

Since the stainless steel base material is a material that is excellent in the corrosion resistance, the corrosion resistance of the separator can be remarkably improved by using the stainless steel base material. Further, since the stainless steel base material has high strength, membrane peeling is suppressed, and thus metal elution is suppressed. In particular, by adding the corrosion resistance of the titanium layer in addition to the corrosion resistance of the stainless steel base material itself, the corrosion resistance of the separator can be remarkably improved.

(4) The fuel cell according to (3), in which the titanium nitride layer may have a membrane thickness of 10 nm to 5 μm.

In a case where the membrane thickness of the titanium nitride layer is in the range of 10 nm to 5 μm, the membrane peeling of the titanium nitride layer can be reduced while the exposure of the stainless steel base material is suppressed, and the separator having the low resistance can be obtained.

(5) The fuel cell according to (4), in which the titanium nitride layer may have a membrane thickness of 10 nm to 3 µm.

In a case where the membrane thickness of the titanium nitride layer is in the range of 10 nm to 3 µm, the membrane peeling of the titanium nitride layer can be reduced while the exposure of the stainless steel base material is suppressed, and the separator having the further low resistance can be obtained.

(6) The fuel cell according to any one of (1) to (5), in which the carbon layer may be in contact with the power generating unit.

Since the carbon layer is in contact with the power generating unit, a current can be effectively caused to flow.

According to the present disclosure, the fuel cell having both the excellent contact resistance and durability can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The present embodiment is a fuel cell including a stacked body of single cells each of which includes a power generating unit and separators disposed on both surfaces of the power generating unit, in which the separators each include a metal base material, a carbon layer made of carbon and formed on a first surface of the metal base material on a power generating unit side, and a titanium nitride layer made of titanium nitride and formed on a second surface of the metal base material opposite to the first surface.

As described above, according to the present embodiment, the fuel cell having both the excellent contact resistance and durability can be provided. In the present embodiment, specifically, the carbon layer made of carbon is formed on the first surface of the separator on the power generating unit side. The carbon layer made of carbon has a high membrane strength due to the excellent durability thereof and has excellent conductivity, and thus the contact resistance of the separator can be reduced. Further, in the fuel cell according to the present embodiment, the titanium nitride layer made of titanium nitride is formed on the second surface (that is, a surface on the adjacent separator side) opposite to the first surface of the separator. By forming the titanium nitride layer on the surface of the separator, the oxidation of the surface of the separator can be suppressed, the formation of an oxide membrane can be suppressed, and an increase in the contact resistance of the separator with time can be suppressed. As a result, an increase in internal resistance of the fuel cell with time can be suppressed.

The fuel cell according to the present embodiment will be described below in detail with reference to the drawings as appropriate.

The fuel cell according to the present embodiment includes the stacked body of the single cells each of which includes the power generating unit and the separators disposed on both surfaces of the power generating unit. The single cells are stacked in a stacking direction, and respective single cells are electrically connected in series.

Figure 1:
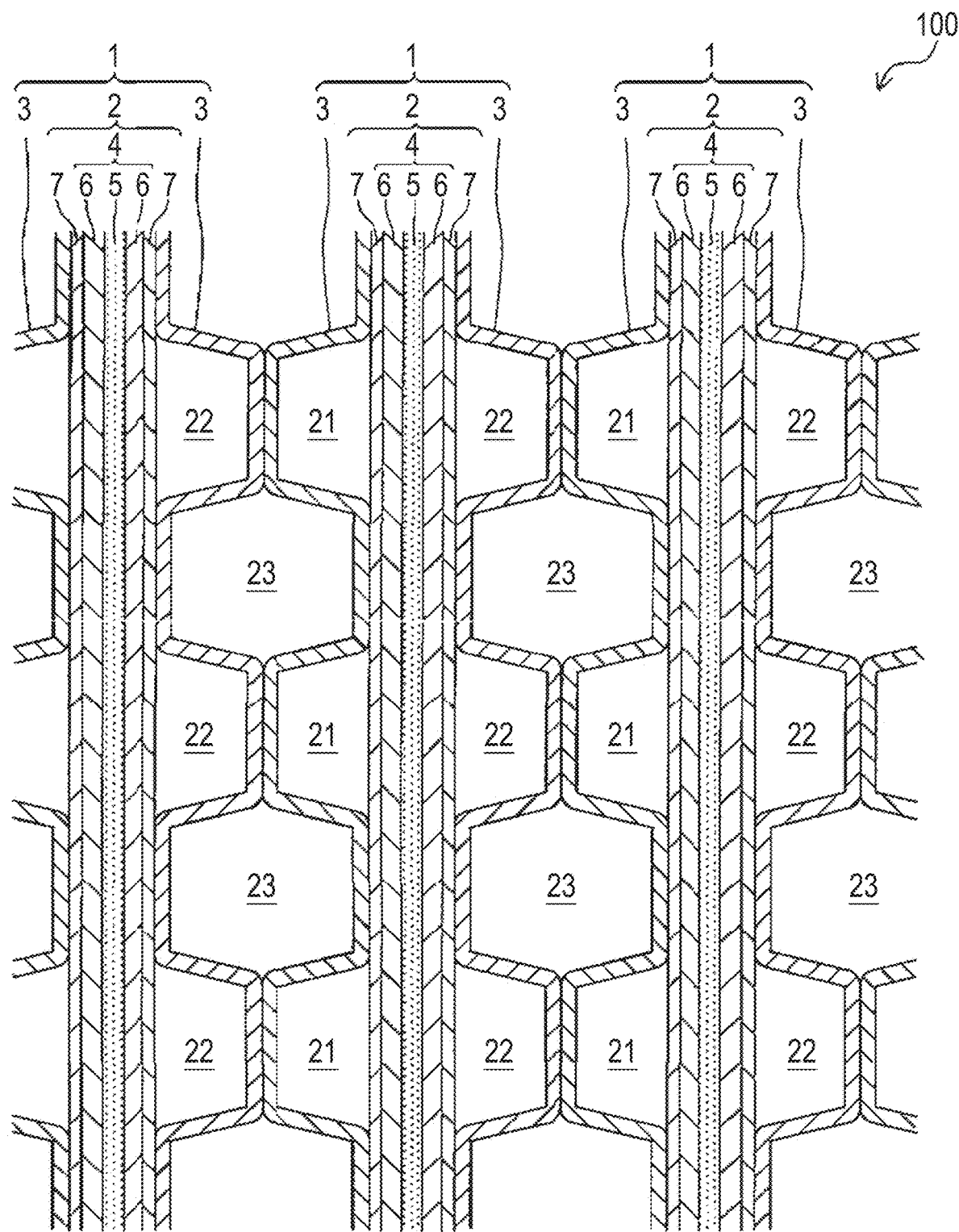
FIG. 1 is a schematic cross-sectional view for describing a configuration example of a fuel cell according to the present embodiment.

FIG. 1 is a schematic cross-sectional view for describing a configuration example of the fuel cell according to the present embodiment, and is a cross-sectional view of main parts of a fuel cell 100 as an example. As shown in FIG. 1, cells of a plurality of single cells 1 that are basic units are stacked in the fuel cell 100. Each of the single cells 1 is a solid polymer electrolyte fuel cell that generates an electromotive force by an electrochemical reaction between oxidant gas (for example, air) and fuel gas (for example, hydrogen). The single cell 1 includes a membrane electrode and gas diffusion layer assembly (MEGA) 2 in which gas diffusion layers (GDL) 7 are disposed on both sides thereof, and a separator 3 that is in contact with the MEGA 2 such that the MEGA 2 is partitioned. In the present embodiment, MEGA 2 is interposed between a pair of separators 3.

The MEGA 2 includes a membrane electrode assembly (MEA) 4 and gas diffusion layers 7 disposed on both surfaces of the membrane electrode assembly 4. The membrane electrode assembly 4 includes an electrolyte membrane 5 and a pair of electrodes 6 assembled to interpose the electrolyte membrane 5 therebetween. The electrolyte membrane 5 is, for example, a proton conductive ion exchange membrane formed of a solid polymer material. Each of the electrodes 6 is formed of, for example, a porous carbon material carrying a catalyst, such as platinum. The electrode 6 disposed on one side of the electrolyte membrane 5 functions as an anode, and the electrode 6 on the other side thereof functions as a cathode. Each of the gas diffusion layers 7 is formed of a gas permeable conductive member. Examples of the gas permeable conductive member include a carbon porous body, such as a carbon paper or a carbon cloth, or a metal porous body, such as a metal mesh or a foamed metal.

The MEGA 2 is the power generating unit of the fuel cell 100, and the separator 3 is in contact with the gas diffusion layer 7 of the MEGA 2. In a case where the gas diffusion layer 7 is not present, the membrane electrode assembly 4 is the power generating unit, and in this case, the separator 3 is in contact with the membrane electrode assembly 4. Therefore, the power generating unit of the fuel cell 100 includes the membrane electrode assembly 4 and is in contact with the separator 3.

The separator 3 is a plate-shaped member having the metal base material (for example, stainless steel base material) as a base material. The metal base material is excellent in the conductivity or the gas impermeableness. In FIG. 1, a surface (first surface) of the separator 3 on the power generating unit side is in contact with the gas diffusion layer 7 of the MEGA 2, and the other surface (surface opposite to the first surface) is in contact with another separator 3 adjacent thereto.

In FIG. 1, each of the separators 3 is formed into a wave shape. The separator 3 has a shape in which a shape of the wave is an isosceles trapezoid, a wave crest is flat, and both ends of the crest are angular at equal angles. That is, each of the separators 3 has substantially the same shape as viewed from a front side and a back side. The crest of the separator 3 is in surface contact with one gas diffusion layer 7 of the MEGA 2, and the crest of the separator 3 is in surface contact with the other gas diffusion layer 7 of the MEGA 2.

A gas flow path 21 defined between the gas diffusion layer 7 on the one electrode (that is, anode) 6 side and the separator 3 is a flow path through which the fuel gas flows, and a gas flow path 22 defined between the gas diffusion layer 7 on the other electrode (that is, cathode) 6 side and the separator 3 is a flow path through which the oxidant gas flows. In a case where the fuel gas is supplied to the gas flow path 21 facing the gas flow path 22 via the single cell 1 and the oxidant gas is supplied to the gas flow path 22, an electrochemical reaction occurs in the single cell 1 to generate an electromotive force.

Further, certain single cell 1 and another single cell 1 adjacent thereto are disposed such that the electrode 6 serving as the anode and the electrode 6 serving as the cathode face each other. Further, a crest of a back surface of the separator 3 disposed along the electrode 6 serving as the anode of the certain single cell 1 and a crest of a back surface of the separator 3 disposed along the electrode 6 serving as the cathode of another single cell 1 are in surface contact with each other. A refrigerant (for example, water) that cools the single cell 1 flows through a space (coolant agent flow path) 23 defined between the separators 3 that are in surface contact with each other between two adjacent single cells 1.

Figure 2:
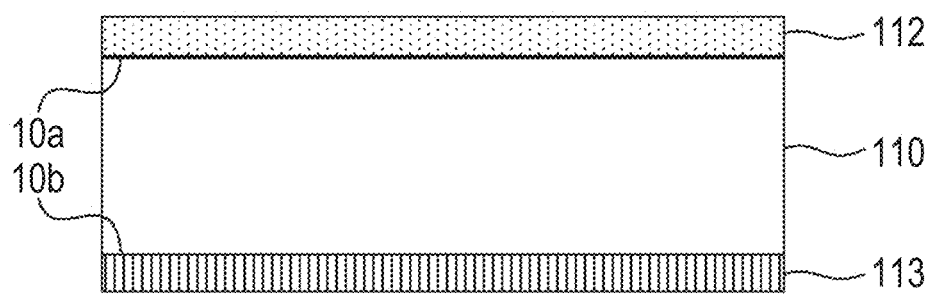
FIG. 2 is a schematic cross-sectional view for describing a configuration example of a separator used in the fuel cell according to the present embodiment.

FIG. 2 is a schematic cross-sectional view showing a part of the separator in an enlarged manner for describing a configuration of a separator 1000. In the separator 1000, a carbon layer 112 made of carbon is formed on the first surface (that is, a surface on the power generating unit side) 10*a* of a stainless steel base material 110 as a metal base material. Also, a titanium nitride layer 113 made of titanium nitride is formed on the second surface (that is, a surface on the adjacent separator side) 10*b* opposite to the first surface 10*a* of the separator 1000.

Figure 3:
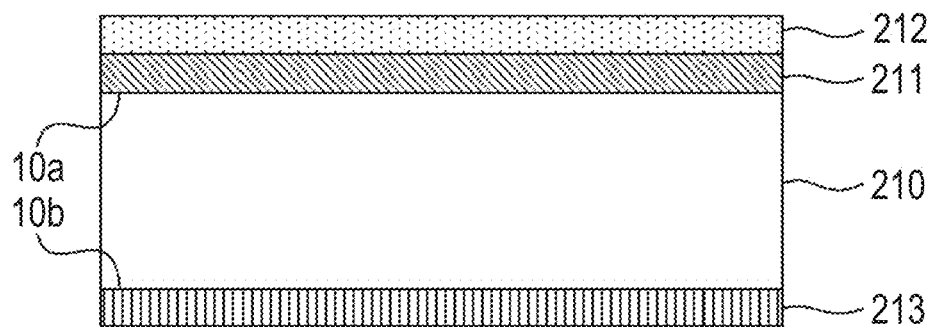
FIG. 3 is a schematic cross-sectional view for describing a configuration example of the separator used in the fuel cell according to the present embodiment.

FIG. 3 is a schematic cross-sectional view showing a part of the separator in an enlarged manner for describing a configuration of a separator 2000. In the separator 2000, a titanium layer 211 made of titanium is formed on the first surface (that is, a surface on the power generating unit side) 10*a* of a stainless steel base material 210 as a metal base material, and a carbon layer 212 made of carbon is formed on the titanium layer 211. Also, a titanium nitride layer 213 made of titanium nitride is formed on the second surface (that is, a surface on the adjacent separator side) 10*b* opposite to the first surface 10*a* of the separator 2000.

As shown in FIG. 3, in the present embodiment, as described above, the titanium layer made of titanium may be formed on the first surface of the separator on the power generating unit side. It is preferable that the titanium layer be formed in contact with the carbon layer and the metal base material. Since the adhesion between the metal base material (for example, a stainless steel base material) and the titanium layer and the adhesion between the titanium layer and the carbon layer are excellent, the titanium layer can further firmly bond the carbon layer to the metal base material (for example, stainless steel base material). As a result, the membrane strength of the carbon layer can be further improved, and the improvement can contribute to the reduction of the contact resistance of the separator. Further, by adding the corrosion resistance of the titanium layer in addition to the corrosion resistance of the metal base material (for example, stainless steel base material) itself, the corrosion resistance of the separator can be remarkably improved.

In the present embodiment, it is preferable that the power generating unit include the gas diffusion layer, and it is preferable that the carbon layer of the separator be in contact with the gas diffusion layer of the MEGA as the power generating unit.

The metal base material is excellent in the conductivity or the gas impermeableness. As the metal base material, the stainless steel base material is preferable. The stainless steel base material is not particularly limited, and examples thereof include an austenite type, a ferrite type, an austenite/ferrite duplex type, a martensite type, and a precipitation hardening type.

The thickness of the metal base material is appropriately selected in consideration of ease of processing, mechanical strength, improvement of cell energy density due to thinning of the separator, and the like, and is, for example, 0.05 mm to 1 mm. In a case where the thickness thereof is in the above range, the needs for weight reduction and thinning of the separator are likely to be satisfied, and the metal base material has strength and handleability as the base material. Therefore, press processing of the base material into the shape of the separator is relatively easy. The shape of the base material may be a long strip wound in a coil shape or a paper sheet cut to a predetermined size.

As described above, the titanium layer made of titanium may be formed on the first surface of the separator on the power generating unit side. The titanium layer is an intermediate layer made of titanium. It is preferable that the titanium layer be formed directly on the metal base material (for example, stainless steel base material), that is, in contact with the metal base material.

The membrane thickness of the titanium layer is not particularly limited, but is, for example, 1 nm to 5 μm, preferably 3 nm to 3 μm, more preferably 5 nm to 1 μm, still more preferably 10 nm to 500 nm, and still more preferably 30 nm to 300 nm. The upper limit values and/or the lower limit values of the numerical ranges can be optionally combined to define a preferable range.

It is preferable that the titanium layer be made substantially of pure titanium. Titanium can be firmly bonded to a metal (for example, stainless steel) or carbon, and has excellent corrosion resistance.

The carbon layer is made of carbon, is configured of a crystalline structure and/or an amorphous structure, and can include a polycrystalline graphite structure. It is preferable that the carbon layer be formed directly on the metal base material or the titanium layer, that is, in contact with the metal base material or the titanium layer. It is preferable that the carbon layer be the uppermost layer of the separator. The carbon layer does not substantially include other materials, such as a resin.

The membrane thickness of the carbon layer is not particularly limited, but is, for example, 1 nm to 5 μm, preferably 5 nm to 3 μm, more preferably 10 nm to 1 μm, still more preferably 15 nm to 500 nm, and still more preferably 20 nm to 200 nm. The upper limit values and/or the lower limit values of the numerical ranges can be optionally combined to define a preferable range.

Further, in the fuel cell according to the present embodiment, as described above, the titanium nitride layer made of titanium nitride is formed on the second surface (that is, a surface on the adjacent separator side) opposite to the first surface of the separator. By forming the titanium nitride layer on the surface of the separator, the elution of metal ions, such as iron, from the metal base material (for example, stainless steel base material) can be suppressed. Further, by forming the titanium nitride layer on the surface of the separator, the oxidation of the surface of the separator can be suppressed, the formation of an oxide membrane can be suppressed, and an increase in the contact resistance of the separator with time can be suppressed. As a result, an increase in internal resistance of the fuel cell with time can be suppressed.

The membrane thickness of the titanium nitride layer is not particularly limited. The membrane thickness of the titanium nitride layer is preferably 10 nm to 5 μm, more preferably 10 nm to 3 μm, still more preferably 10 nm to 1 μm, still more preferably 15 nm to 500 nm, still more preferably 20 nm to 400 nm, and still more preferably 30 nm to 300 nm. The upper limit values and/or the lower limit values of the numerical ranges can be optionally combined to define a preferable range.

In the present embodiment, it is preferable that adjacent separators be in contact with each other via the titanium nitride layer formed on each second surface thereof.

The titanium layer may be formed as the intermediate layer between the titanium nitride layer and the metal base material (for example, stainless steel base material). By forming the titanium layer as the intermediate layer, the titanium nitride layer can be firmly bonded to the metal base material (for example, stainless steel base material), and thus the durability of the separator can be further improved.

The membrane formation methods of the titanium layer, the carbon layer, and the titanium nitride layer are not particularly limited, and examples thereof include a physical vapor deposition (PVD) method, such as a sputtering method or an ion plating method, or an ion beam deposition method, such as a filtered cathodic vacuum arc (FCVA) method. Among these examples, it is preferable to use the sputtering method or the ion plating method. Examples of the sputtering method include a magnetron sputtering method, an unbalanced magnetron sputtering (UBMS) method, a dual magnetron sputtering method, or an ECR sputtering method. Further, examples of the ion plating method include an arc ion plating method. In particular, for the membrane formation of the carbon layer, it is preferable to use the ion plating method and more preferable to use the arc ion plating method. According to these methods, the carbon layer having a low hydrogen content can be formed. As a result, a ratio of bonds between carbon atoms (sp2 hybridized carbon) can be increased, and excellent conductivity can be achieved.

Further, in the sputtering method, the quality of the obtained membrane can be controlled by controlling the bias voltage and the like. In a case where the membrane formation of the layer is performed by the sputtering method, a negative bias voltage may be applied to the base material during sputtering. Therefore, the layer can be formed densely and the corrosion resistance can be improved. The magnitude of the negative bias voltage applied when the membrane formation of the carbon layer is performed is not particularly limited, but is, for example, 5 V to 75 V, 10 V to 50 V, or 15 V to 40 V.

In the separator used for the fuel cell according to the present embodiment, the membrane formation of all the titanium layer, the carbon layer, and the titanium nitride layer can be performed by the physical vapor deposition (PVD) method. A manufacturing process can be simplified by performing the membrane formation of all the layers by the PVD method. Further, the carbon layer formed by the PVD method is firm and has an advantage that the membrane breakage and the membrane peeling are unlikely to occur.

Examples of the electrolyte membrane in the fuel cell include a solid electrolyte membrane including a fluorine-based electrolyte resin. Examples of the fluorine-based electrolyte resin include a perfluorosulfonic acid-based polymer, and specifically include Nafion (registered trademark, manufactured by DuPont), Flemion (registered trademark, manufactured by Asahi Glass Co., Ltd.), and Aciplex (registered trademark, manufactured by Asahi Kasei Corporation). Among these examples, Nafion (registered trademark, manufactured by DuPont) is excellent in the proton conductivity, and thus can be preferably used.

The fuel cell is not particularly limited, but can be applied as, for example, a cell mounted on a fuel cell vehicle.

Hereinafter, the present embodiment will be described with reference to Example.

Example 1

As the base material, a stainless steel base material (SUS304) having a flow path shape was prepared. Then, by using a PVD membrane forming device, the membrane formation of the titanium layer and the carbon layer were sequentially performed on the first surface of the stainless steel base material. Specifically, first, the stainless steel base material was disposed in a reaction vessel of the device, an inside of a reaction vessel was evacuated, and a temperature therein was raised by an internal heater (temperature in reaction vessel: 150° C.). Next, a pure Ti cathode target used for sputtering was etched (cleaned) with plasmatized Ar gas. Further, in order to remove the passivation present on the surface of the stainless steel base material, the stainless steel base material was etched with plasmatized Ar gas. Next, by using the pure Ti cathode target described above, the membrane formation of the titanium layer was performed by the unbalanced magnetron sputtering (UBMS) method (membrane thickness: 100 nm). Next, by using a high-purity ta-C raw material, the membrane formation of the carbon layer was performed by the arc ion plating (AIP) method (membrane thickness: 50 nm).

Next, by using the PVD membrane forming device, the titanium nitride layer was formed on the second surface of the stainless steel base material. Specifically, after disposing the base material in the reaction vessel of the device, the inside of the reaction vessel was evacuated and the temperature therein was raised by the internal heater. Next, the TiN cathode target used for sputtering was etched (cleaned) with the plasmatized Ar gas. Further, in order to remove the passivation present on the surface of the stainless steel base material, the stainless steel base material was etched with plasmatized Ar gas. Next, using the TiN cathode target described above, the membrane formation of the titanium nitride layer was performed by the unbalanced magnetron sputtering (UBMS) method (membrane thickness: 100 nm).

Through the above processes, a separator E1 having the titanium layer and the carbon layer on the first surface and the titanium nitride layer on the second surface was obtained.

A test of the contact resistance at an interface between the carbon layer of the separator E1 and the power generating unit was performed in a manner in which a voltage applied between the carbon paper and the separator when a current of 1 A was caused to flow was measured in a state where a carbon paper as the gas diffusion layer was placed on the carbon layer of the separator E1 and a fixed compressive load of 1 MPa was applied in the stacking direction. As a result, the contact resistance at the interface between the carbon layer of the separator E1 and the power generating unit was 1.2 mΩ·cm². It was confirmed that this value was lower than the result (4 mΩ·cm² to 5 mΩ·cm²) of contact resistance disclosed in the examples of JP 2016-201205 A, so that the separator of the present embodiment had excellent conductivity.

Further, a test of the contact resistance at an interface between adjacent separators was performed in a manner in which a voltage applied between the separators when a current of 1 A was caused to flow was measured in a state where two separators E1 were superposed such that the titanium nitride layers thereof face each other and a fixed compressive load of 1 MPa was applied in the stacking direction. As a result, the contact resistance at the interface between the adjacent separators was 1.8 mΩ·cm².

REFERENCE EXAMPLE

By using the PVD membrane forming device, the membrane formation of the titanium nitride layer was performed on the stainless steel base material (SUS304, thickness: 100 µm). Specifically, after disposing the stainless steel base material in the reaction vessel of the device, the inside of the reaction vessel was evacuated and the temperature therein was raised by the internal heater. Next, the TiN cathode target used for sputtering was etched (cleaned) with the plasmatized Ar gas. Further, in order to remove the passivation present on the surface of the stainless steel base material, the stainless steel base material was etched with plasmatized Ar gas. Next, using the TiN cathode target described above, the membrane formation of the titanium nitride layer was performed by the unbalanced magnetron sputtering (UBMS) method (membrane thickness: 100 nm).

Other conditions were set as follows.
temperature in reaction vessel: 150° C.
degree of vacuum: 0.3 Pa
Ar flow rate: 200 sccm
negative bias voltage of base material: 75 V
base material bias type: PLS
target bias type: DC
Ti cathode output: 6 kW
UBM coil current: 2 A
revolution speed: 5 rpm The membrane formation time was adjusted to form the titanium nitride layers having a membrane thickness of 5 nm, 10 nm, 20 nm, 30 nm, 70 nm, 120 nm, 180 nm, 1000 nm, 3000 nm, 5000 nm, or 10000 nm, respectively, on the stainless steel base material. Although the TiN cathode target was used in this reference example, the membrane formation of the titanium nitride layer may be performed by a reactive sputtering method in which the membrane formation is performed while introducing nitrogen gas by using the pure Ti cathode target.

A test of the contact resistance at an interface between adjacent separators was performed in a manner in which a voltage applied between the separators when a current of 1 A was caused to flow was measured in a state where two base materials were superposed such that the titanium nitride layers thereof face each other and a fixed compressive load of 1 MPa was applied in the stacking direction. The results are shown in Table 1 and FIG. 4.

TABLE 1

| Membrane thickness of titanium nitride layer (nm) | Contact resistance (mΩ · cm²) |
|---|---|
| 10000 | 5.7 |
| 5000 | 1.7 |
| 3000 | 0.5 |
| 1000 | 0.7 |
| 180 | 0.5 |
| 120 | 0.5 |
| 70 | 0.9 |
| 30 | 0.7 |
| 20 | 1.0 |
| 10 | 0.9 |
| 5 | 10.8 |

Figure 4:
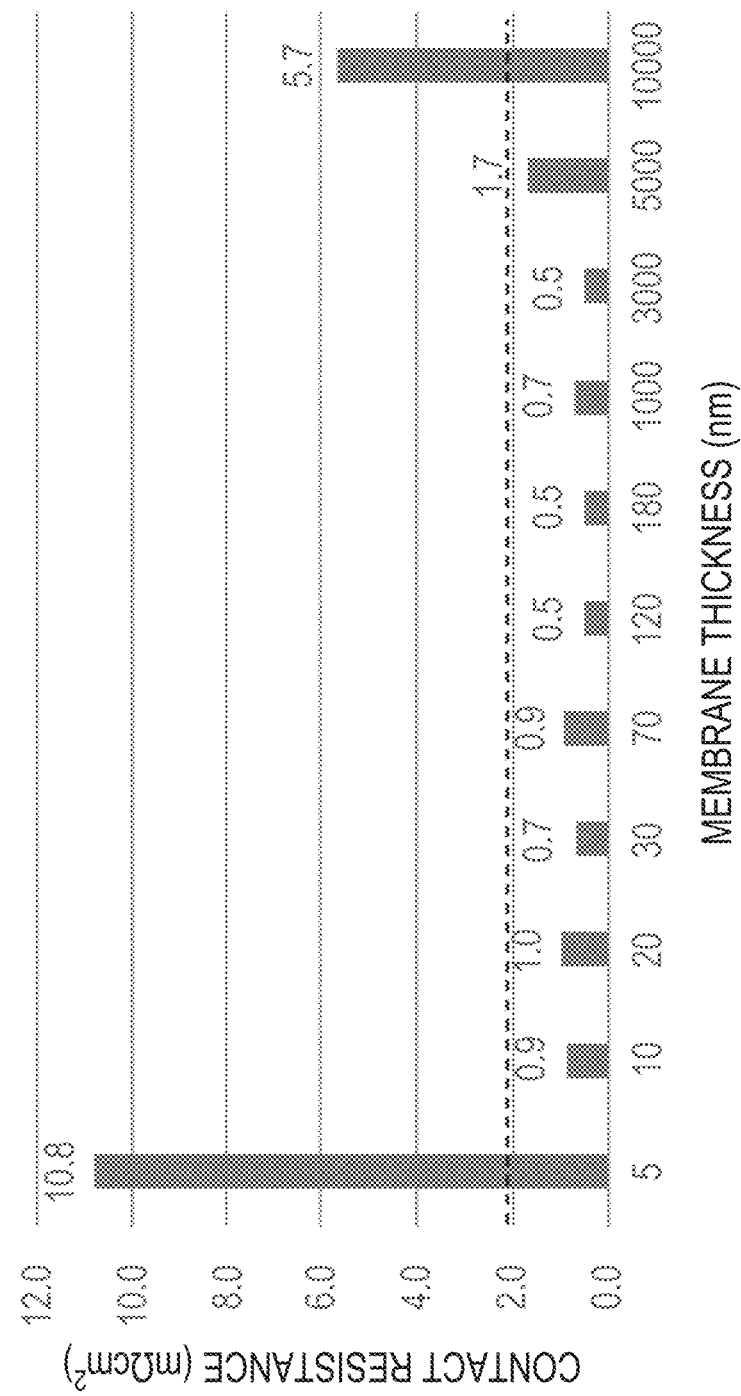
FIG. 4 is a graph showing the result in a reference example.

As shown in Table 1 and FIG. 4, in a case where the titanium nitride layer has a thickness of 10 nm to 5 µm, preferably 10 nm to 3 µm, it is understood that further low contact resistance can be obtained.

The upper limit values and/or the lower limit values of the numerical ranges described in the present specification can be optionally combined to define a preferable range. For example, the upper limit values and the lower limit values of the numerical ranges can be optionally combined to define a preferable range, the upper limit values of the numerical ranges can be optionally combined to define a preferable range, and the lower limit values of the numerical ranges can be optionally combined to define a preferable range.

Although the present embodiment has been described in detail above, the specific configuration is not limited to this embodiment, and even in a case where there are design changes within the scope not departing from the gist of the present disclosure, the changes are included in the present disclosure.

What is claimed is:

1. A fuel cell comprising a stacked body of single cells each of which includes a power generating unit and separators disposed on both surfaces of the power generating unit,
   wherein the separators each include
     a metal base material,
     a carbon membrane consisting of carbon and directly contacting a first surface of the metal base material on a power generating unit side, and
     a titanium nitride layer made of titanium nitride and contacting a second surface of the metal base material opposite to the first surface.

2. The fuel cell according to claim 1, wherein the metal base material is a stainless steel base material.

3. The fuel cell according to claim 2, wherein the titanium nitride layer has a membrane thickness of 10 nm to 5 µm.

4. The fuel cell according to claim 3, wherein the titanium nitride layer has a membrane thickness of 10 nm to 3 µm.

5. The fuel cell according to claim 1, wherein the carbon membrane is in contact with the power generating unit.

* * * * *